(12) United States Patent
Boecker et al.

(10) Patent No.: US 8,615,680 B2
(45) Date of Patent: Dec. 24, 2013

(54) PARITY-BASED VITAL PRODUCT DATA BACKUP

(75) Inventors: Douglas M. Boecker, Rochester, MN (US); Brent W. Jacobs, Rochester, MN (US); Nathan D. Miller, Rochester, MN (US); Matthew S. Spinler, Rochester, MN (US); Shaun A. Wetzstein, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 13/008,044

(22) Filed: Jan. 18, 2011

(65) Prior Publication Data

US 2012/0185724 A1 Jul. 19, 2012

(51) Int. Cl.
*G06F 11/00* (2006.01)

(52) U.S. Cl.
USPC ........................................ 714/6.24

(58) Field of Classification Search
USPC .......................................................... 714/6.24
See application file for complete search history.

(56) References Cited

U.S. PATENT DOCUMENTS

| | | | |
|---|---|---|---|
| 7,376,761 B2 * | 5/2008 | Dubal et al. ...................... 710/8 |
| 7,568,123 B2 * | 7/2009 | Goodman et al. ............. 714/6.3 |
| 2003/0084397 A1 * | 5/2003 | Peleg ............................ 714/770 |
| 2006/0149859 A1 * | 7/2006 | Dubal et al. ...................... 710/8 |
| 2007/0070994 A1 * | 3/2007 | Burroughs et al. ........... 370/381 |
| 2008/0147931 A1 | 6/2008 | McDaniel et al. |
| 2009/0193150 A1 * | 7/2009 | Graves et al. ..................... 710/3 |

* cited by examiner

*Primary Examiner* — Bryce Bonzo
(74) *Attorney, Agent, or Firm* — Rabin & Berdo, P.C.

(57) ABSTRACT

A method for maintaining vital product data (VPD) of each field replaceable unit (FRUs) in a computer system, the computer system including a first FRU and a second FRU operatively coupled with the first FRU. The method includes calculating a parity for the VPD of the second FRU, and upon detecting a failure of the second FRU, regenerating the VPD for the failed second FRU using the parity.

17 Claims, 4 Drawing Sheets

PARITY-BASED VITAL PRODUCT DATA BACKUP

BACKGROUND

1. Technical Field

The present invention relates to computer system maintenance. More specifically, it relates to a method for maintaining the vital product data (VPD) of different field replaceable units (FRUs) of a computer system.

2. Background Information

A computer system is composed of many FRUs, namely, circuit boards or parts that can be easily removed from the computer system and replaced, even by someone lacking in-depth product knowledge of the computer system. These FRUs include power supply units, motherboards, socketed microprocessors, primary storage modules (e.g. Radom Access Memories, or RAMs), secondary storage devices (e.g. hard drives and optical drives), video cards, sound cards, and peripherals such as keyboards, mice and printers. Replacing an FRU while the machine is running is known as hot swapping.

Many FRUs have VPD stored thereon. The VPD is a collection of configuration and informational data associated with a particular set of hardware (e.g. an FRU), to allow for the set of hardware to be administered at a system or network level. VPDs may include product model numbers, unique serial numbers, product release levels, maintenance levels, and other information specific to the hardware, as well as user-defined information, such as the building and department location of the hardware. The VPDs are used by a computer system to determine the nature of a specific hardware, and to shield the operation of the computer system from minor changes and variations of hardware implementations.

Since VPDs are of a critical importance to the reliability and extendibility of the computer system, in many computer systems such as the POWER series and zSeries servers of IBM, a primary EEPROM (Electrically Erasable Programmable Read-Only Memory) is utilized to store the VPD for an FRU, whereas a redundant EEPROM is used on the FRU to keep an extra copy of the VPD, in case the primary EEPROM may fail. However, this extra copy brings additional expenses, not only for the additional hardware part (i.e. the redundant EEPROM), but also for additional interface paths that must be wired to the additional hardware part. Other computer systems keep a persistent copy of the VPDs centrally located, e.g. on a service processor. However, this requires a copy of all of the system VPDs to be centrally stored, thereby incurring additional expenses.

SUMMARY

A method for maintaining vital product data (VPD) of each field replaceable unit (FRUs) in a computer system, the computer system including a first FRU and a second FRU operatively coupled with the first FRU. The method includes calculating a parity for the VPD of the second FRU, and upon detecting a failure of the second FRU, regenerating the VPD for the failed second FRU using the parity.

DETAILED DESCRIPTION

Figure 1:
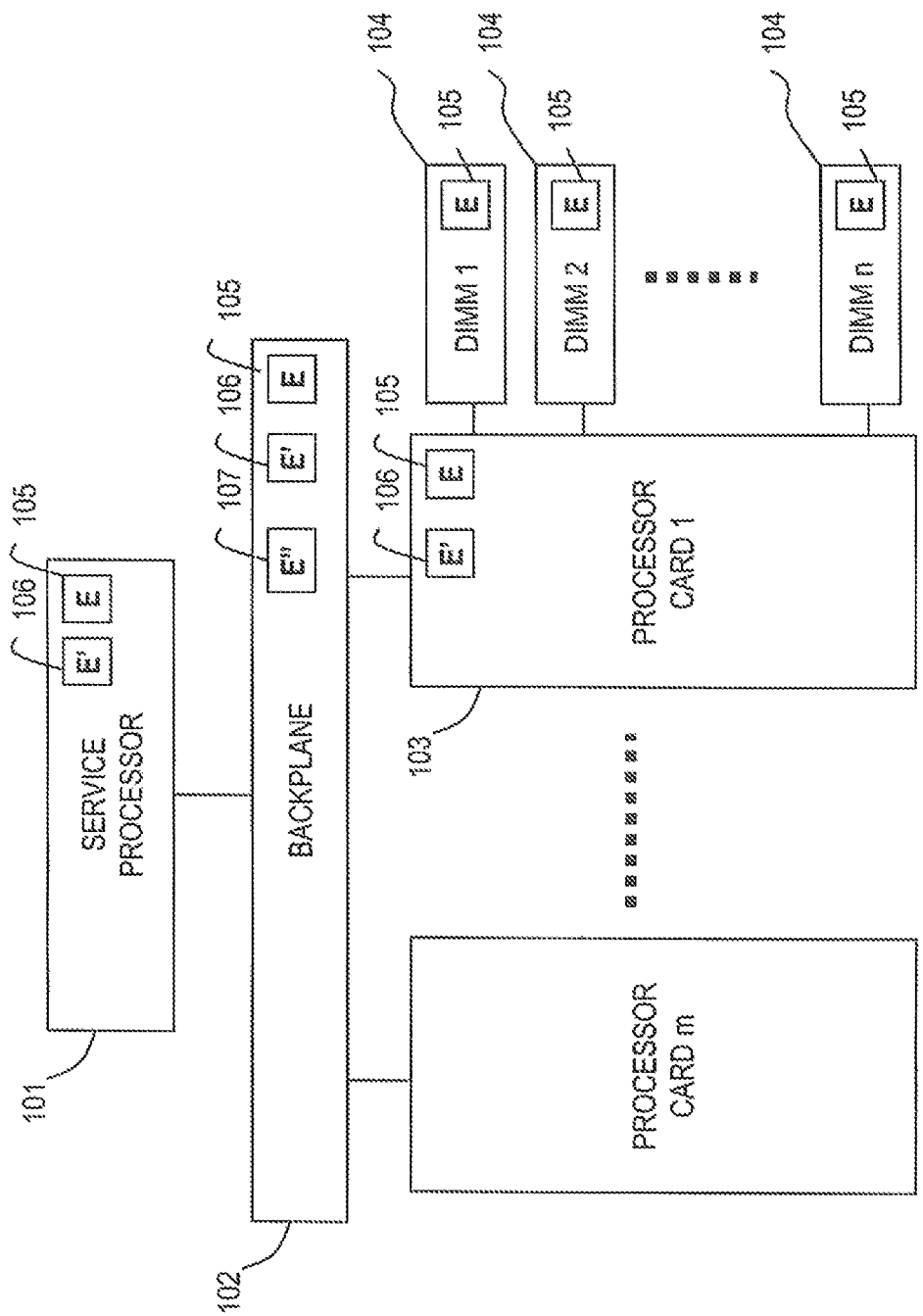
FIG. 1 shows a computer system including exemplar FRUs in one embodiment of the invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In an embodiment of the present invention, rather than keeping a mirrored copy of all VPDs on each FRU or centrally storing the mirrored copy on a service processor, a block level parity method, such as the block level parity method used in RAID (Redundant Array of Independent Disks) Level 4, may be used to generate parity for a collection of VPDs for a group of FRUs, and, if one of the FRUs fails, to rebuild the VPD of the failed FRU using the parity and the VPDs of the other FRUs in the same group. Any block level parity method known in the art may be used to generate the parity. The group of FRUs is called a parity group, and is determined by hardware packaging, as described below. In one embodiment of the invention, an extra EEPROM is added to store the parity for each parity group. The parity is calculated when the VPDs of the parity group are collected from the system, and is subsequently stored on the additional EEPROM. If an additional FRU is added to the group, or a VPD for a FRU in the group is changed, the parity is recalculated. If a FRU fails, its VPD is rebuilt from the parity and other VPDs in the parity group. A software error-correcting code may be used to rebuild the VPD using parity information, thereby enabling VPD data recovery, ranging from simple VPD data corruption to total EEPROM chip failure, with no redundant VPD hardware (e.g. backup EEPROM chips and interface paths connected to the EEPROM chips) needed.

The parity groups may be determined in a hierarchical fashion, as illustrated in FIG. 1 for one embodiment of the invention. The computer system of FIG. 1 includes a service processor 101 connected to a backplane 102. A plurality of processor cards 103 are plugged into the backplane 102. Each processor card 103 has a plurality of DIMMs (Dual In-line Memory Modules) plugged therein. All of the service processor 101, the backplane 102, the processor cards 103 and the DIMMs 104 are FRUs, and thus each have their own VPD. The service processor 101, the backplane 102, the processor cards 103 and the DIMMs 104 each have an EEPROM (E) 105 that stores the VPD. The service processor 101, the backplane 102, and the processor cards 103 also each have an extra EEPROM (E') 106 for storing parity information. The backplane 102 also has a second extra EEPROM (E") 107 for storing the parity for the service processor 101. The EEPROMs (E) 105, (E') 106 and (E") 107 may be implemented using physically-separate individual EEPROMs, or using different logical EEPROMs obtained by dividing a single physical EEPROM. In the latter case, because the logical portions are parts of different separate parity groups, each logical EEPROM could still be regenerated from the remainder of its respective parity group. Having physically separate EEPROMs is in some scenarios preferable for its higher reliability, whereas using one physical EEPROM with multiple logical EEPROMs could have an advantage on cost.

Figure 2:
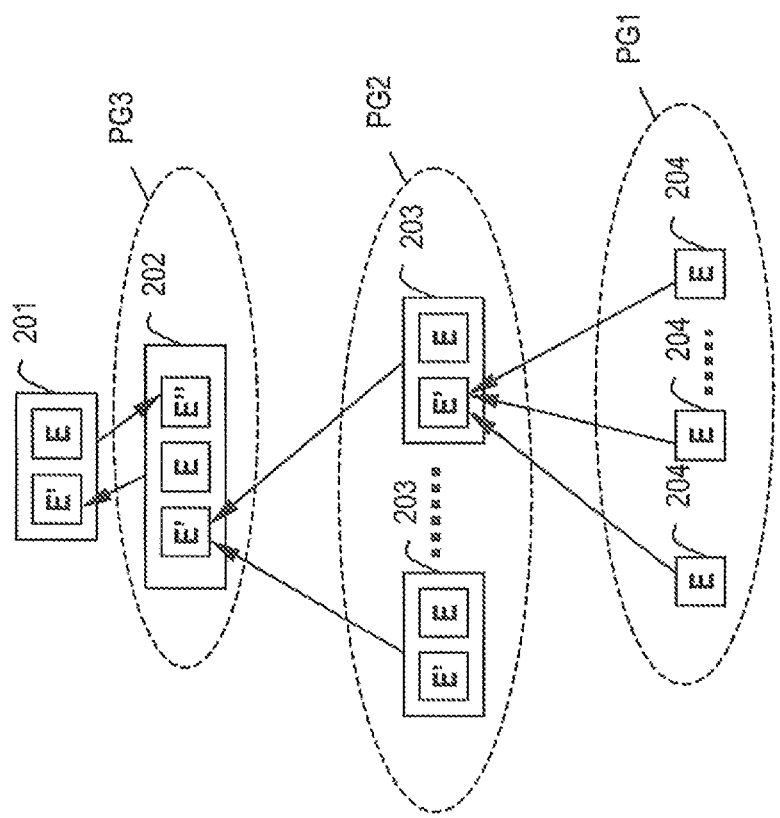
FIG. 2 illustrates the hierarchy of parity of the VPD for all FRUs in the computer system of FIG. 1.

The DIMMs 104 (i.e. DIMM 1~DIMM n) form a parity group (see PG1 in FIG. 2). The parity of the VPDs of all DIMMs 104 in the parity group is stored on E' 106 of the processor card 103 in which the DIMMs 104 are plugged (i.e. Processor Card 1). Thus, if any one of the DIMMs 104 fails, the parity will not be lost. The parity of all DIMMs 104 may be stored at a location in the computer system other than the DIMMs 104, for example, on the service processor 101. However, in one embodiment of the invention, by storing the parity of all DIMMs 104 on the processor card 103 that is necessary for the DIMMs 104 to be plugged into, no additional EEPROM is needed at some other location to keep the parity information, so as to more efficiently maintain the parity, especially when the computer system is not fully populated.

Similarly, since the processor cards 103 (i.e. Processor Card 1~Processor Card m) are plugged into the backplane 102, the EEPROM E' 106 of the backplane 102 stores the parity for all the processor cards 103 connected to the backplane 102.

At the highest level of the hierarchy, redundant copies of the parity is kept on both the service processor 101 and the backplane 102, to avoid data and parity being stored on the same FRU. As such, no FRU in the computer system has an EEPROM or EEPROMS that contain both data and parity for its parity group, thereby greatly increasing the reliability of the computer system. Of course, different computer systems may also be used. As another example, an alternate computer system may include multiple subsystems, each having a configuration similar to that shown in FIG. 1, wired together to form a single system. The single system may thus have multiple backplanes and multiple service processors. As such, another level of VPD hierarchy is added above the level of the service processor in FIG. 1.

FIG. 2 illustrates the hierarchy of the parity of all FRUs in the computer system of FIG. 1. At the highest level of the hierarchy lies the EEPROM block 201 of the service processor 101, including both the EEPROM E 105 and the extra EEPROM E' 106. EEPROM blocks 202 and 203, at the middle levels of the hierarchy, respectively correspond to the EEPROMs of the backplane 102 and the processor cards 103. EEPROM block 204 at the lowest level of the hierarchy only has the EEPROM E 105 of each of the DIMMs 104. Each of the EEPROM E in the EEPROM blocks 201-204 stores the VPD of the corresponding FRU (i.e. service processor, backplane, processor card or DIMM). The EEPROM blocks 204 belong to a parity group (i.e. PG 1), and the parity of all VPDs contained in the EEPROM blocks 204 is calculated and stored in the EEPROM E' of the EEPROM block 203 at the next higher level of the hierarchy. Similarly, the EEPROM blocks 203 belong to another parity group (i.e. PG 2), and the parity of all VPDs contained in the EEPROM blocks 203 is calculated and stored in the EEPROM E' of the EEPROM block 202 at the next higher level of the hierarchy. For each parity group 203 and 204, the parity is generated from the VPD content only. The parity from the next lower level is not combined with the VPD from the current level to generate the parity for the current level, because otherwise it would create a cascade effect causing each higher level to have to regenerate its own parity whenever data or parity at a lower level was changed.

At the highest two levels of the hierarchy, the parity of the VPD contained the EEPROM block 202 is calculated and stored in the EEPROM E' 106 of the EEPROM block 201, and the parity of the VPD contained the EEPROM block 201 is calculated and stored in the EEPROM E" 107 of the EEPROM block 202, so as to avoid storing both the VPD and the parity on the same FRU.

Therefore, during initial collection of the VPDs, the parity for each group is calculated and stored in the extra EEPROM on the next higher level of the hierarchy. If one of the EEPROMs containing VPD or parity fails, the VPD or parity contained in the EEPROM is regenerated according to other data and parity within the same parity group. For example, if one of the EEPROMs 204 fails, the parity in E' of EEPROM block 203, in conjunction with the data in E of the remaining EEPROM blocks 204, is used to calculate the VPD of the failed EEPROM 204. If the EEPROM E' of one of the EEPROM blocks 203 fails, the data in E of the corresponding EEPROM blocks 204 is used to calculate the parity of the failed E'. This newly generated VPD or parity is then stored in a persistent backup storage, of a limited amount, on either the service processor 101 or the back plane 102. This reduces the overall amount of EEPROM devices needed in the system. As FRUs are added or removed from the system, appropriate parity is updated. If a parity group (e.g. PG3 in FIG. 2) only has one FRU in it, the parity essentially serves as a mirror copy.

Figure 3:
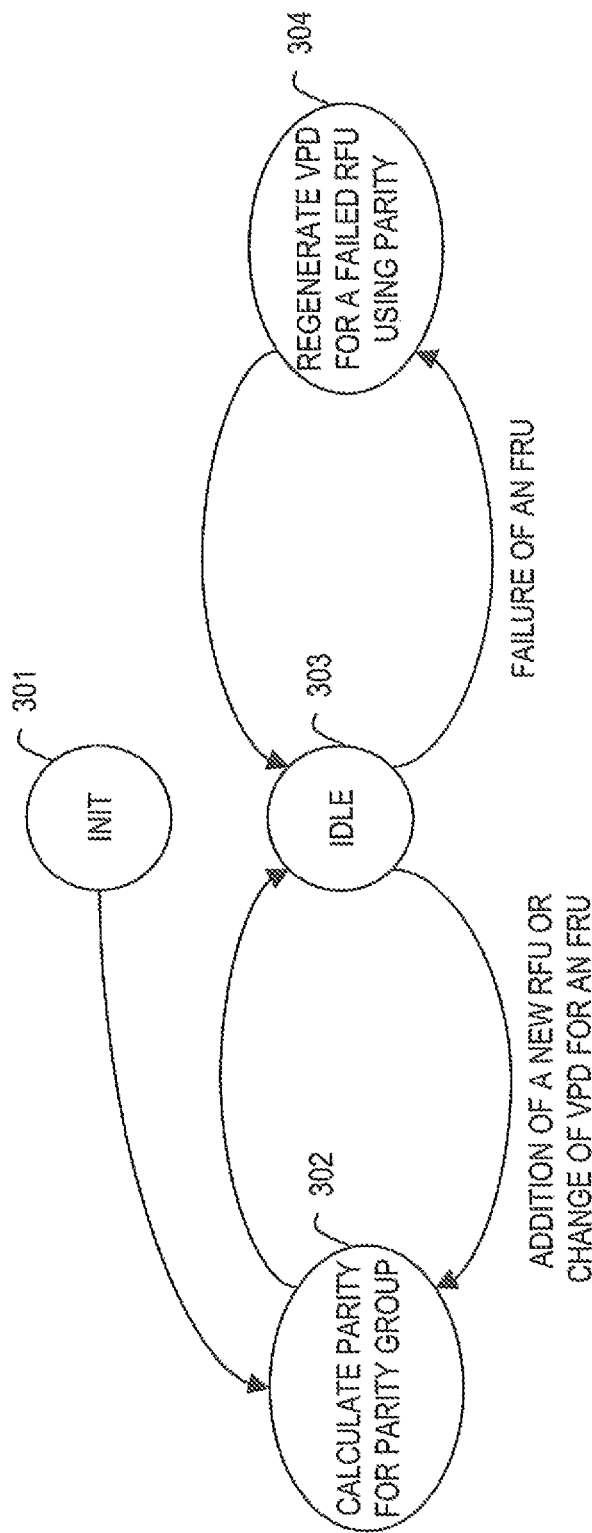
FIG. 3 is a state diagram demonstrating a working process of one embodiment of the invention.

FIG. 3 is a state diagram demonstrating how the maintenance in one embodiment of the invention works. A parity for each parity group is calculated (state 302) right after the VPD from each FRU is read (state 301). Next, the maintenance enters an IDLE state (state 303) in which the functionality of all FRUs are monitored. If an addition of a new FRU to a parity group, or a value change of a VPD for one FRU in a parity group, is detected, the maintenance returns to state 302, and the parity of that parity group is recalculated (state 302). If, however, a failure of a FRU in a parity group is detected, the regeneration process starts (state 304) using the parity previously calculated in state 302, as well as the VPDs of other FRUs in the parity group. The maintenance re-enters the IDLE state (state 303) after finishing the regeneration process (state 304) or the parity calculation process (state 302).

The VPD collection process occurs after a reset of the service processor or some other indication (e.g. such as from a user) where a FRU might have been changed. As part of that collection process, we read the VPD from the EEPROM on each FRU in the system. The data read from the EEPROM is compared against the cached data for that given FRU location. If the FRU currently installed is the same one for which cached data exists (e.g. by comparing serial number) then the collection process determines if the cached data for that FRU is "dirty". If so then the data is written out and the "dirty" bit cleared, if not then nothing else happens. If the cached data is not from the same FRU that is currently installed, the cached data is discarded and the data from the installed FRU is cached. This would also in effect clear the "dirty" bit.

Figure 4:
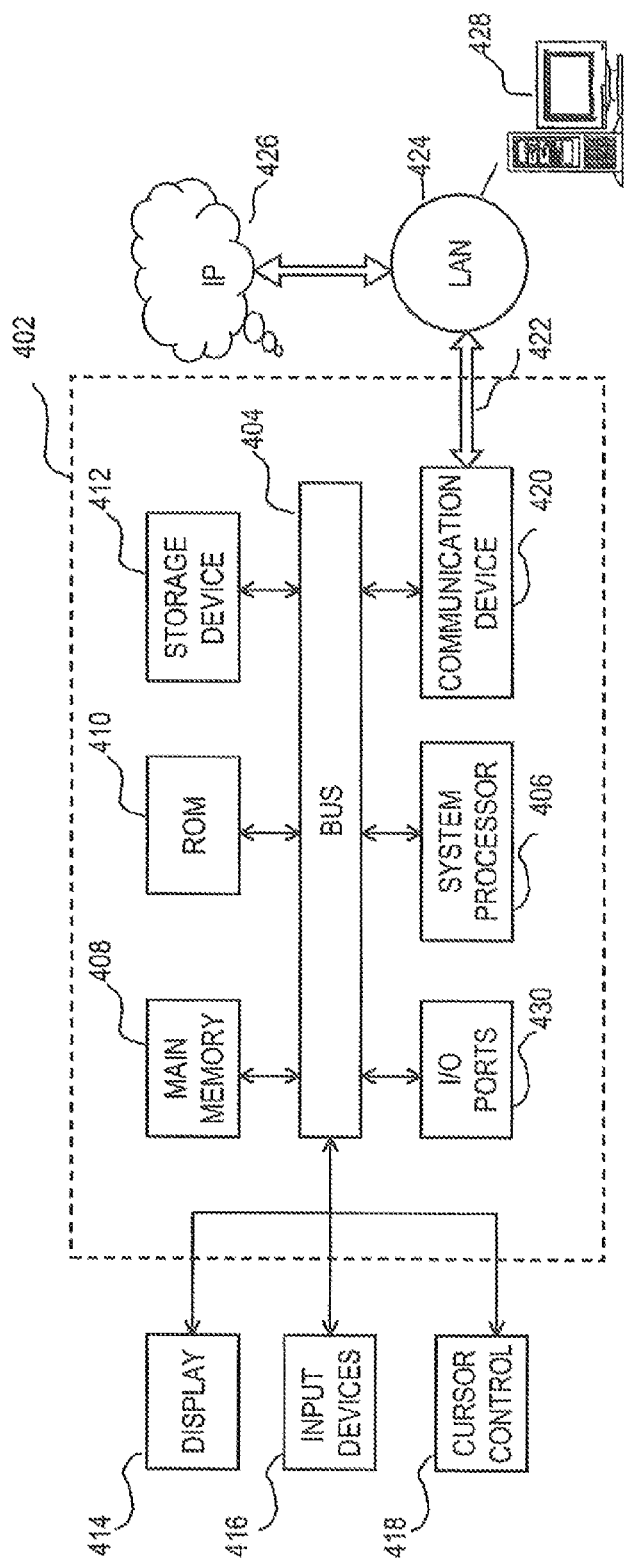
FIG. 4 illustrates a computer system upon which the present invention may be implemented.

FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) 410 or other static storage device (e.g., programmable ROM (PROM), erasable PROM (EPROM), and electrically erasable PROM (EEPROM)) coupled to bus 404 for storing static information and instructions for processor. A storage device (412), such as a magnetic disk or optical disk, is provided and coupled to bus for storing information and instructions. This storage device is an example of a computer readable medium.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIGS. 1-3. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (416) and a cursor control (418), for communicating information and command selections to processor (406). Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line. Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (426) through local network (424) (e.g., a LAN) or through equipment operated by a service provider, which provides communication services through a communications network (428). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for maintaining vital product data (VPD) of each of a plurality of field replaceable units (FRUs) in a computer system, comprising, for each of the plurality of FRUs:
   determining a parity group of said each FRU, the parity group including all FRUs, among the plurality of FRUs, that are operatively coupled to said each FRU;
   calculating a parity using the VPDs of the FRUs in the parity group; and
   storing the calculated parity on said each FRU.

2. The method of claim 1, further comprising, upon detecting a failure of one of the FRUs in the parity group,
   retrieving the stored parity from said each FRU; and
   regenerating a VPD for the failed FRU using the retrieved parity and the VPDs of all of the FRUs, except for the failed one, of the parity group.

3. The method of claim 1, wherein
   the VPD of said each FRU is stored in a first EEPROM (Electrically Erasable Programmable Read-Only Memory) on said each FRU; and
   the parity is stored in a second EEPROM on said each FRU.

4. The method of claim 3, wherein the first EEPROM and the second EEPROM are two logical EEPROMs of a single physical EEPROM.

5. The method of claim 1, further comprising:
   calculating a parity using the VPD of said each FRU; and
   storing the calculated parity of said each FRU on one of the FRUs in the parity group.

6. The method of claim 1, further comprising re-calculating the parity upon detection of an addition of a new FRU to the parity group, or a change of the VPD of one of the FRUs in the parity group.

7. A computer program product to maintain vital product data (VPD) of each of a plurality of field replaceable units (FRUs) in a computer system, the computer program product comprising:
   a non-transitory computer usable medium having computer usable program code embodied therewith, the computer usable program code comprising instructions, for each of the plurality of FRUs,
      to determine a parity group of said each FRU, the parity group including all FRUs, among the plurality of FRUs, that are operatively coupled to said each FRU;
      to calculate a parity using the VPDs of the FRUs in the parity group; and
      to store the calculated parity on said each FRU.

8. The computer program product of claim 7, further comprising,
  instructions to, upon detecting a failure of one of the FRUs in the parity group,
  retrieve the stored parity from said each FRU; and
  regenerate a VPD for the failed FRU using the retrieved parity and the VPDs of all of the FRUs, except for the failed one, of the parity group.

9. The computer program product of claim 7, wherein
  the VPD of said each FRU is stored in a first EEPROM (Electrical Erasable Programmable Read-Only Memory) on said each FRU; and
  the parity is stored in a second EEPROM on said each FRU.

10. The computer program product of claim 9, wherein the first EEPROM and the second EEPROM are two logical EEPROMs of a single physical EEPROM.

11. The computer program product of claim 7, further comprising instructions to,
  calculate a parity using the VPD of said each FRU, and
  store the calculated parity of said each FRU on one of the FRUs in the parity croup.

12. The computer program product of claim 7, further comprising instructions to re-calculate the parity upon detection of an addition of a new FRU to the parity group, or a change of the VPD of one of the FRUs in the parity group.

13. A computer system, comprising:
  a plurality field replaceable units (FRUs); and
  a computer program product to maintain vital product data (VPD) of each of the plurality of FRUs, the computer program product comprising:
    a non-transitory computer usable medium having computer usable program code embodied therewith, the computer usable program code comprising instructions, for each of the plurality of FRUs,
      to determine a parity group of said each FRU, the parity group including all FRUs, among the plurality of FRUs, that are operatively coupled to said each FRU;
      to calculate a parity using the VPDs of the FRUs in the parity group; and
      to store the calculated parity on said each FRU.

14. The computer system of claim 13, further comprising,
  instructions to, upon detecting a failure of one of the FRUs in the parity group,
  retrieve the stored parity from said each FRU; and
  regenerate a VPD for the failed FRU using the retrieved parity and the VPDs of all of the FRUs, except for the failed one, of the parity group.

15. The computer system of claim 13, wherein the VPD of said each FRU is stored in a first EEPROM (Electrically Erasable Programmable Read-Only Memory) on said each FRU; and
  the parity is stored in a second EEPROM on said each FRU.

16. The computer system of claim 15, wherein the first EEPROM and the second EEPROM are two logical EEPROMs of a single physical EEPROM.

17. The computer system of claim 13, further comprising instructions to,
  calculate a parity using the VPD of said each FRU, and
  store the calculated parity of said each FRU on one of the FRUs in the parity group.

* * * * *